_(12)_ United States Patent
Hisada et al.

(10) Patent No.: US 11,260,752 B2
(45) Date of Patent: Mar. 1, 2022

(54) INSTRUMENT PANEL FOR LEISURE VEHICLE

(71) Applicant: KAWASAKI JUKOGYO KABUSHIKI KAISHA, Kobe (JP)

(72) Inventors: Kazumasa Hisada, Akashi (JP); Toshio Araki, Kakogawa (JP); Kazuki Ishibashi, Kobe (JP); Yoshinobu Uozumi, Akashi (JP)

(73) Assignee: KAWASAKI JUKOGYO KABUSHIKI KAISHA

( * ) Notice: Subject to any disclaimer, the term of this patent is extended or adjusted under 35 U.S.C. 154(b) by 18 days.

(21) Appl. No.: 16/728,367

(22) Filed: Dec. 27, 2019

(65) Prior Publication Data

US 2021/0197664 A1    Jul. 1, 2021

(51) Int. Cl.
| | |
|---|---|
| *G06T 7/50* | (2017.01) |
| *G06T 7/70* | (2017.01) |
| *G06K 9/20* | (2006.01) |
| *G06K 9/78* | (2006.01) |
| *B60K 35/00* | (2006.01) |

(52) U.S. Cl.
CPC ........ *B60K 35/00* (2013.01); *B60K 2370/115* (2019.05); *B60K 2370/148* (2019.05); *B60K 2370/155* (2019.05); *B60K 2370/1523* (2019.05); *B60K 2370/165* (2019.05); *B60K 2370/167* (2019.05); *B60K 2370/172* (2019.05); *B60K 2370/173* (2019.05); *B60K 2370/176* (2019.05); *B60K 2370/56* (2019.05); *B60K 2370/731* (2019.05)

(58) Field of Classification Search
None
See application file for complete search history.

(56) References Cited

U.S. PATENT DOCUMENTS

| | | | | |
|---|---|---|---|---|
| 6,222,546 | B1 * | 4/2001 | Yokoyama | G09B 9/063 345/418 |
| 6,845,317 | B2 * | 1/2005 | Craine | B60K 37/02 701/454 |
| 2005/0012599 | A1 * | 1/2005 | DeMatteo | B60K 37/06 340/425.5 |
| 2005/0232469 | A1 * | 10/2005 | Schofield | B60Q 1/08 382/104 |
| 2006/0040570 | A1 * | 2/2006 | Tsumiyama | B63B 34/10 440/2 |
| 2010/0178815 | A1 * | 7/2010 | Leblanc | B63H 21/24 440/1 |
| 2014/0025290 | A1 * | 1/2014 | Kindel | G08G 1/096741 701/454 |
| 2014/0222340 | A1 * | 8/2014 | Celia | G01C 21/34 701/533 |

(Continued)

FOREIGN PATENT DOCUMENTS

WO    WO-2019103991 A1 *    5/2019    ............ G08G 1/165

*Primary Examiner* — Martin Mushambo

(57) ABSTRACT

An instrument panel for a leisure vehicle includes a display including a first region including a central part of the display, the first region being configured to display a predetermined image set by a user or a video from a camera installed in the vehicle. The display also includes a second region including at least a part of a peripheral part of the display, the second region being configured to display travelling information indicating a travelling condition.

13 Claims, 5 Drawing Sheets

(56) References Cited

U.S. PATENT DOCUMENTS

| | | | |
|---|---|---|---|
| 2014/0244110 A1* | 8/2014 | Tharaldson | G06Q 50/01 701/36 |
| 2015/0015457 A1* | 1/2015 | Takasu | G02B 27/01 345/7 |
| 2015/0234186 A1* | 8/2015 | Meadows | G02B 27/017 345/8 |
| 2015/0260534 A1* | 9/2015 | Shen | G01C 21/34 701/408 |
| 2016/0049109 A1* | 2/2016 | Engel | G09G 3/20 345/4 |
| 2016/0187666 A1* | 6/2016 | Manns | G02B 30/52 359/479 |
| 2017/0061632 A1* | 3/2017 | Lindner | G01S 7/4972 |
| 2017/0080952 A1* | 3/2017 | Gupta | B60W 50/14 |
| 2017/0315771 A1* | 11/2017 | Kerr | H04N 7/181 |
| 2017/0330463 A1* | 11/2017 | Li | B60K 37/04 |
| 2018/0012091 A1* | 1/2018 | Ricci | H04B 5/0037 |
| 2018/0144673 A1* | 5/2018 | Prema | G09G 3/003 |
| 2018/0164597 A1* | 6/2018 | Bell | G09G 3/003 |
| 2018/0181287 A1* | 6/2018 | O'Brien | G09G 5/14 |
| 2018/0190168 A1* | 7/2018 | Mans | G06F 3/04883 |
| 2018/0201133 A1* | 7/2018 | Sumiya | B60K 35/00 |

* cited by examiner

IMAGE OR VIDEO

INSTRUMENT PANEL FOR LEISURE VEHICLE

BACKGROUND OF THE INVENTION

Field of the Invention

The present invention relates to an instrument panel for a leisure vehicle, such as an all-terrain vehicle (ATV) or a four-wheeled buggy, and a personal watercraft (PWC).

Description of Related Art

Instrument panels for leisure vehicles generally display travelling information of the vehicles, such as a speed and an engine rotation speed. Although some instrument panels display an image from e.g. an automotive navigation system, there is no instrument panel that displays a personal image and/or personal data.

SUMMARY OF THE INVENTION

An object of the present invention is to provide an instrument panel for a leisure vehicle, which can improve enjoyment in leisure time.

In order to achieve the above object, an instrument panel for a leisure vehicle according to a first aspect of the present invention may include a display, the display including a first region including a central part of the display, the first region being configured to display a predetermined image set by a user or a video from a camera installed in the vehicle, and a second region including at least a part of a peripheral part of the display, the second region being configured to display travelling information indicating a travelling condition. The term "leisure vehicle" used herein may include any travelling body for land and/or on-water activities.

This configuration makes it possible to display a family photo or an image of preference or the like of the user, or a video captured by the camera installed in the vehicle on the instrument panel. This enhances enjoyment in leisure time as well as makes it possible to check surrounding circumstances through the video from the camera, improving operability of the vehicle.

In the first aspect of the present invention, the first region may account for 50% or more of the whole display. This configuration can further enhance enjoyment in leisure time and operability of the vehicle, thanks to the large first region.

In the first aspect of the present invention, the second region may include at least one of an upper part, a left part, and a right part of the display. According to this configuration, the travelling information of importance is displayed in the upper part, the left part or/and the right part of the display so as to be easily recognized. Therefore, operability of the vehicle can further be improved. In such a case, the second region may also include a lower part of the display. According to this configuration, the lower part of the display can also be advantageously used for displaying the travelling information.

In the first aspect of the present invention, the travelling information may include an indicator that indicates a failure state of the leisure vehicle. According to this configuration, operability of the vehicle can further be improved since the failure state can be visually recognized.

In the first aspect of the present invention, the second region may further be configured to display the current time, and the current time may be displayed in a color that changes in accordance with a time frame in which the current time is included. According to this configuration, the current time can be roughly recognized based on the color without requiring the display to be stared at. Therefore, it is easy to determine e.g., a timing to stop driving.

In the first aspect of the present invention, the instrument panel may further include a sound controller configured to, in response to a command from the user to a speaker installed in the leisure vehicle and configured to output audio information including music, control an operation of the speaker. According to this configuration, enjoyment in leisure time can be further enhanced not only through visual pleasure but also through auditory pleasure.

In the first aspect of the present invention, the first region may be provided therein with a second display configured to display the travelling information, the travelling information in the second display may be displayed in the first region in accordance with a travelling speed. According to this configuration, the second display may be used to provide the travelling information, such as a speed, for example, when travelling at high speed or low speed. This makes it easy to check circumstances when travelling at high speed or low speed, further improving operability of the vehicle.

In the first aspect of the present invention, the first region may display a video of an area behind the vehicle captured by the camera when the vehicle enters a backward travelling condition. This configuration makes it possible to drive backward while looking at the video of the area behind the vehicle, facilitating driving backward. This further improves operability of the vehicle.

In the first aspect of the present invention, the first region may display a video of an area ahead the vehicle captured by the camera when driving on a rough road on land. Rough-road driving may be detected on the basis of, for example, a motion of a suspension of an ATV (a four-wheeled buggy). This configuration makes it possible to drive while checking a condition of the course ahead through the video of the area ahead the vehicle, improving operability of the vehicle when driving on a rough road.

In the first aspect of the present invention, a portable controller may be used to select the predetermined image in the first region. The portable controller may be, for example, a smartphone. This configuration makes it easy to switch the predetermined image to another.

An instrument panel for a leisure vehicle according to a second aspect of the present invention may include a display, the display including: a first region including a central part of a display, the first region being configured to display travelling information indicating a travelling condition; and a second region including at least a part of a peripheral part of the display, the second region being configured to display a predetermined image set by a user or a video from a camera installed in the leisure vehicle.

This configuration makes it possible to display a family photo or an image of preference or the like of the user, or a video captured by the camera installed in the vehicle on the instrument panel. This enhances enjoyment in leisure time as well as makes it possible to check surrounding circumstances through the video from the camera, improving operability of the vehicle. The travelling information is displayed in the first region located in the center of the image, which makes it easy to see the travelling information and further improves operability of the vehicle.

In the second aspect of the present invention, the predetermined image or the video from the camera installed in the leisure vehicle may be displayed in the left part or the right part of the display within the second region. This configuration further improves enjoyment in leisure time and operability of the vehicle since the left part or the right part of the display is easy to see.

In the second aspect of the present invention, the predetermined image may also be displayed in the lower part of the display within the second region. According to this configuration, since the lower part included in the second region is hard to see, the predetermined image is displayed in the lower part, but the video from the camera is not displayed in the lower part. Thus, the lower part of the display can also be advantageously used to further enhance enjoyment in leisure time.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

DESCRIPTION OF THE EMBODIMENTS

Figure 1:
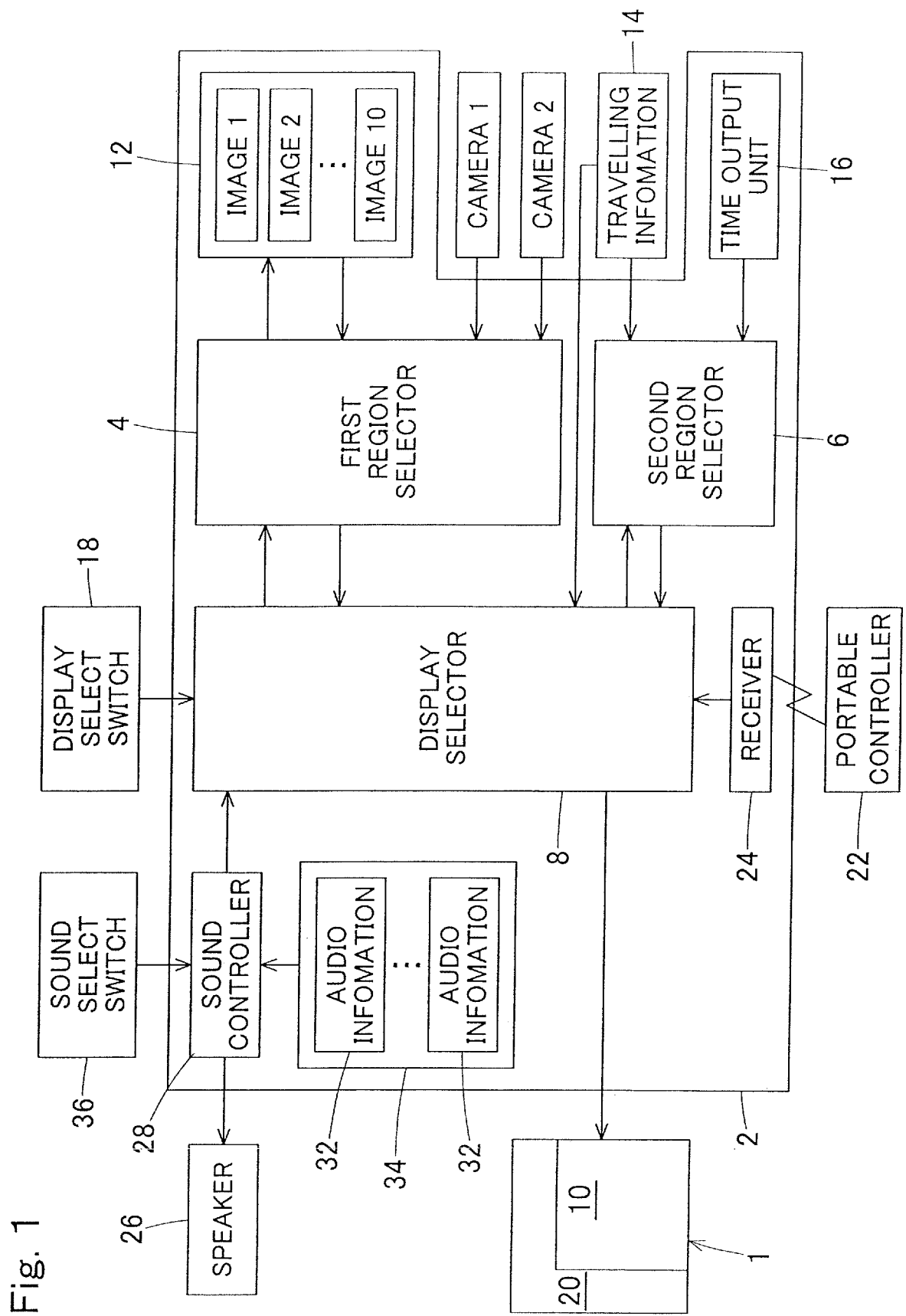
FIG. 1 is a system diagram of an instrument panel for a leisure vehicle according to a first embodiment of the present invention.
Figure 2:
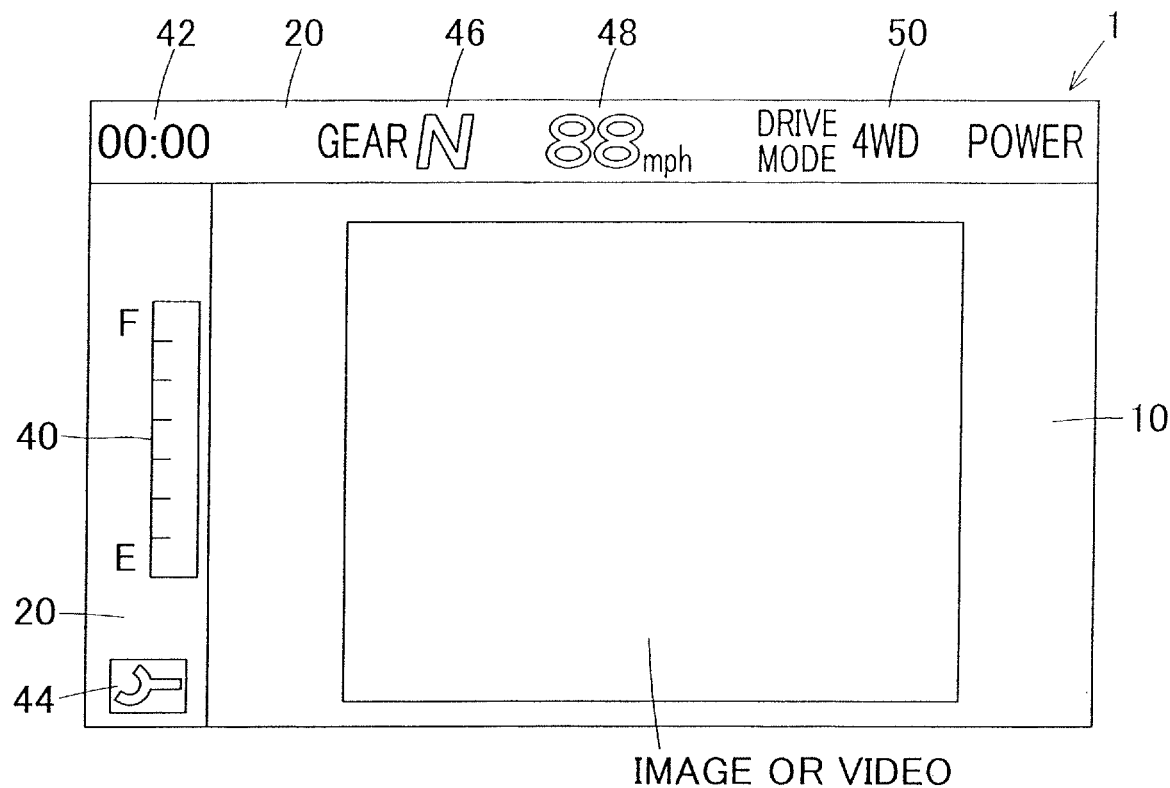
FIG. 2 shows a display of the instrument panel.

Hereinafter, the present invention will be described as to preferred embodiments thereof with reference to the accompanying drawings. FIG. 1 is a system diagram of an instrument panel 1 for a leisure vehicle according to a first embodiment of the present invention. FIG. 2 shows an example of a display of the instrument panel 1. The term "leisure vehicle" used herein may include any travelling body for land and/or on-water use. Specifically, the leisure vehicle may be, for example, a utility vehicle, an ATV (a four-wheeled buggy), and a personal watercraft (PWC). It should be noted that the leisure vehicle is not limited to these examples.

The instrument panel 1 of this embodiment may be, for example, a liquid crystal panel (TFT liquid crystal display). The instrument panel 1, however, is not limited to this. The instrument panel 1 includes a first region 10 including a central part of the display and a second region 20 including at least a part of a peripheral part of the display. In the following description, right and left sides of the display correspond to right and left sides seen by a driver (user) of the vehicle, respectively.

As shown in FIG. 2, in this embodiment, the first region 10 accounts for 50% or more of the whole display. The first region 10, however, may be less than 50% of the whole display. In this embodiment, the second region 20 includes a left part and an upper part of the display. However, the second region 20 is not limited to the example shown in FIG. 2, as long as the second region includes at least one of the upper part, the left part and the right part of the display. In addition, the second region 20 may also include a lower part of the display. The second region 20 is arranged in an area which is relatively easy to see in view of vehicle types and installation structure of the instrument panel 1 since the area which is relatively easy to see would be different depending on these factors.

As shown in FIG. 1, information to be displayed on the instrument panel 1 is controlled by a display controller 2. The display controller 2 includes a program and is executed by a computer. Although the instrument panel 1 in this embodiment is separate from the computer for operating the display controller 2, they may be integrated together where, for example, a computer integrated with a touch panel is used as the instrument panel 1.

The display controller 2 includes a first region selector 4 configured to select an image to be displayed in the first region 10, a second region selector 6 configured to select an image to be displayed in the second region 20, and a display selector 8 configured to output the images selected by the selectors 4, 6 to the instrument panel 1.

In this embodiment, the first region 10 displays a predetermined image set by a user or a video from a camera installed in the vehicle. The "predetermined image" is a family photo or an image of preference or the like and is stored in an image storage unit 12 (including image 1, image 2 . . . image 10 in FIG. 1). Although the image storage unit 12 in this embodiment is stored in the same device as the display controller 2, it may be stored in a storage device that is separately provided. The image storage unit 12 may store one or more images. In this embodiment, the image storage unit 12 stores 10 images 1 to 10, as an example.

In this embodiment, the vehicle is provided with a camera 1 for monitoring an area ahead the vehicle and a camera 2 for monitoring an area behind the vehicle. It should be noted that the number of the cameras is not limited to this, and there may be one or more than two cameras. The camera(s) may be omitted. The first region selector 4 selects an image/video to be displayed in the first region 10 from the images 1 to 10 and the cameras 1, 2 in response to a command from the display selector 8, and then, sends it to the display selector 8.

The second region 20 displays travelling information 14 that indicates a travelling condition. The travelling information 14 is a signal from a sensor, a switch or the like provided to the vehicle, and includes: for example, a speed of the vehicle; forward movement/backward movement/stop of the vehicle; operation/stop of an engine; a rotation speed of the engine; a remaining amount of fuel; an output from an inertia measuring device (gyro); and a failure state of the vehicle. Where the vehicle is a utility vehicle, the travelling information 14 may include a signal from an electronically controlled suspension. The travelling information 14, however, is not limited to these. The travelling information may include other information (signals) or may include some of the abovementioned information (signals).

The second region 20 may display current time 42 from a time output unit 16. The time output unit 16 may use, for example, a system clock of the computer for executing the display controller 2. The second region selector 6 selects information to be displayed in the second region 20 from the travelling information 14 and the current time 42 in response to a command from the display selector 8, and then, sends it to the second region selector 6. In this embodiment, the travelling information 14 is also output to the display selector 8.

Switching among the images/videos by the display selector 8 is carried out through a display select switch 18. The display select switch 18 is an operating member to be operated by the user and is, for example, a push button. Where a computer integrated with a touch panel is used as the instrument panel 1, the touch panel may be provided with the display select switch 18. In response to an operation of the display select switch 18 by the user, the display selector 8 outputs a command to the first region selector 4 to select the image/video to be displayed in the first region 10, and at the same time, outputs a command to the second region selector 6 to select information to be displayed in the second region 20. Although the information to be displayed in the second region 20 is fixed in this embodiment, it can be changed by a command from the display selector 8.

Switching among the images/videos by the display selector 8 can also be carried out through a portable controller 22. Specifically, the display controller 2 is provided with a receiver 24, and a signal from the portable controller 22 is input to the display selector 8 via the receiver 24. The portable controller 22 may be, for example, a smartphone, a tablet terminal or the like. The portable controller 22 may be configured such that the portable controller 22 is allowed to change the display only through selection of a predetermined image (images 1 to 10) to be displayed in the first region 10, and is not allowed to change selection of the video from the camera to be displayed in the first region 10 and selection of the travelling information 14 to be displayed in the second region 20.

As described above, the travelling information 14 is also output to the display selector 8. Switching among the images/videos by the display selector 8 can also be carried out on based on the travelling information 14. For example, the first region 10 may be configured to display a video of an area ahead the vehicle captured by the camera 1 during normal travelling and to display a video of an area behind the vehicle captured by the camera 2 when the vehicle enters a backward travelling condition. This makes it possible to drive backward while checking the area behind the vehicle.

Where the vehicle is an ATV (a four-wheeled buggy) or a utility vehicle or the like, the first region 10 may be configured to display a video of an area ahead the vehicle captured by the camera 1 when it is determined that the vehicle is in a rough-road travelling condition. The determination of the rough-road travelling condition is made, for example, based on a motion of a suspension for supporting a wheel such that it is determined that the vehicle is travelling on a rough road when the suspension is compressed/expanded to a large extent or in short periods. This makes it possible to drive on a rough road while checking the area ahead the vehicle.

Figure 3:
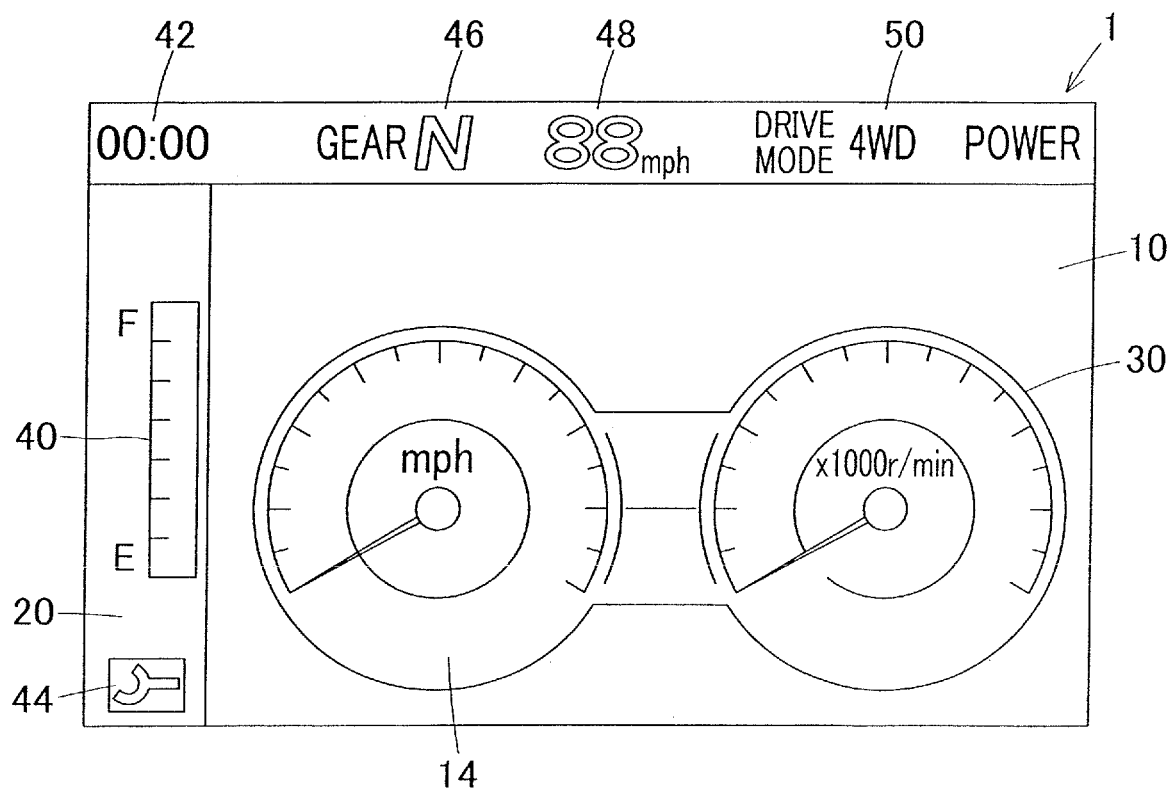
FIG. 3 shows another display of the instrument panel.

Further, as shown in FIG. 3, the first region 10 may be provided therein with a second display 30, and the second display 30 may be configured to display the travelling information 14 in accordance with a travelling speed. Specifically, the second display 30 appears or is activated in the first region 10, e.g., in high-speed travelling when the travelling speed exceeds a predetermined value, and the second display 30 displays the travelling information 14.

Where the second region 20 displays the current time 42, the current time 42 may be displayed in a color that changes in accordance with a time frame in which the current time is included. For example, the current time may be displayed in a relatively dark color during the daytime and in a relatively bright color during the night time. This makes it possible to roughly recognize the time based on the color without requiring the display of the current time to be stared at.

Further, in this embodiment, the leisure vehicle is provided with a speaker 26 and a sound controller 28 configured to control an operation of the speaker 26. The speaker 26 is configured to output audio information 32 including music and may be, for example, a loudspeaker. The speaker 26 may be provided integrally with or separately from the instrument panel 1. In this embodiment, the audio information 32 is stored in a sound storage unit 34. One or more set of the audio information 32 may be stored.

Switching of the sound by the sound controller 28 is carried out through a sound select switch 36. The sound select switch 36 is an operation member configured to be operated by the user and may be, for example, a push button. Where a computer integrated with a touch panel is used as the instrument panel 1, the sound select switch 36 may be provided to the touch panel. In response to the operation of the sound select switch 36 by the user, the sound controller 28 selects the audio information 32 to be output by the speaker 26, and then, sends it to the speaker 26.

As shown in FIG. 2 illustrating an example of the display, the instrument panel 1 of this embodiment displays a fuel gauge 40 indicating a remaining amount of fuel, current time 42, an indicator 44 indicating occurrence of a failure, a gear position 46, a speedometer 48 and a drive mode 50 in the second region 20. It should be noted that the travelling information 14 to be displayed in the second region 20 is not limited to these. The first region 10 displays an image selected by the first region selector 4 (FIG. 1).

As described above, when a speed exceeds a predetermined value, the second display 30 is activated in the first region 10 as shown in FIG. 3. The second display 30 displays the travelling information 14. In the example illustrated in FIG. 3, the second display 30 displays a vehicle speed and an engine rotation speed. The travelling information 14 to be displayed in the second display 30 is not limited to these. This makes it possible to drive while precisely checking the travelling condition.

The above configuration makes it possible to display a family photo or an image of preference or the like of a user or a video captured by the camera installed in the vehicle in the first region 10 of the instrument panel 1 shown in FIG. 2. This enhances enjoyment in leisure time as well as makes it possible to check surrounding circumstances through the video from the camera, improving operability of the vehicle. Since the first region 10 accounts for 50% or more of the whole display and is large, enjoyment in leisure time and operability of the vehicle are improved.

The second region 20 for displaying the travelling information 14 is provided in the left part and the upper part of the instrument panel 1. This allows the travelling information 14 of importance to be displayed in the left part and the upper part of the display for easy recognition, further improving operability of the vehicle. Additionally, the travelling information 14 includes an indicator 44 indicating a failure state of the vehicle. This makes it possible to visually recognize the failure state, further improving operability of the vehicle.

The current time 42 is displayed in the second region 20 and has a color that changes in accordance with a time frame in which the current time is included. This makes it possible to roughly recognize the current time based on the color without requiring the display of the current time to be stared at. Therefore, it is easy to determine e.g., a timing to stop driving.

As shown in FIG. 1, the speaker 26 configured to output the audio information 32 is installed in the vehicle, and the operation of the speaker 26 is controlled by the sound controller 28 in response to a command by a user. This further enhances enjoyment in leisure time not only through visual pleasure but also through auditory pleasure.

Where a travelling speed exceeds a predetermined value, the second display 30 for displaying the travelling information 14 is activated in the first region 10 of the instrument panel 1, as shown in FIG. 3. This makes it possible to, for example, use the large second display 30 to provide the travelling information, such as a speed, during driving at high speed. This makes it easy to check circumstances while driving at high speed, and thereby, further improves operability of the vehicle.

When the vehicle enters the backward travelling condition, the first region 10 in FIG. 2 displays the video from the camera 2 (FIG. 1) for monitoring the area behind the vehicle. This makes it possible to drive backward while visually checking the video of the area behind the vehicle, making it easy to drive backward. Therefore, operability of the vehicle can further be improved.

While driving on a rough road on land, the first region 10 of the instrument panel 1 display the video from the camera 1 (FIG. 1) for monitoring the area ahead the vehicle. Rough-road driving is detected on the basis of, for example, a motion of an electronically controlled suspension of an ATV (a four-wheeled buggy). This makes it possible to drive while checking a condition of the course ahead, improving operability of the vehicle when driving on a rough road.

The portable controller 22 can be used to select an image (images 1 to 10) to be displayed in the first region 10. This allows the image to be switched from outside, making it easy to switch among the predetermined images 1 to 10.

Figure 4:
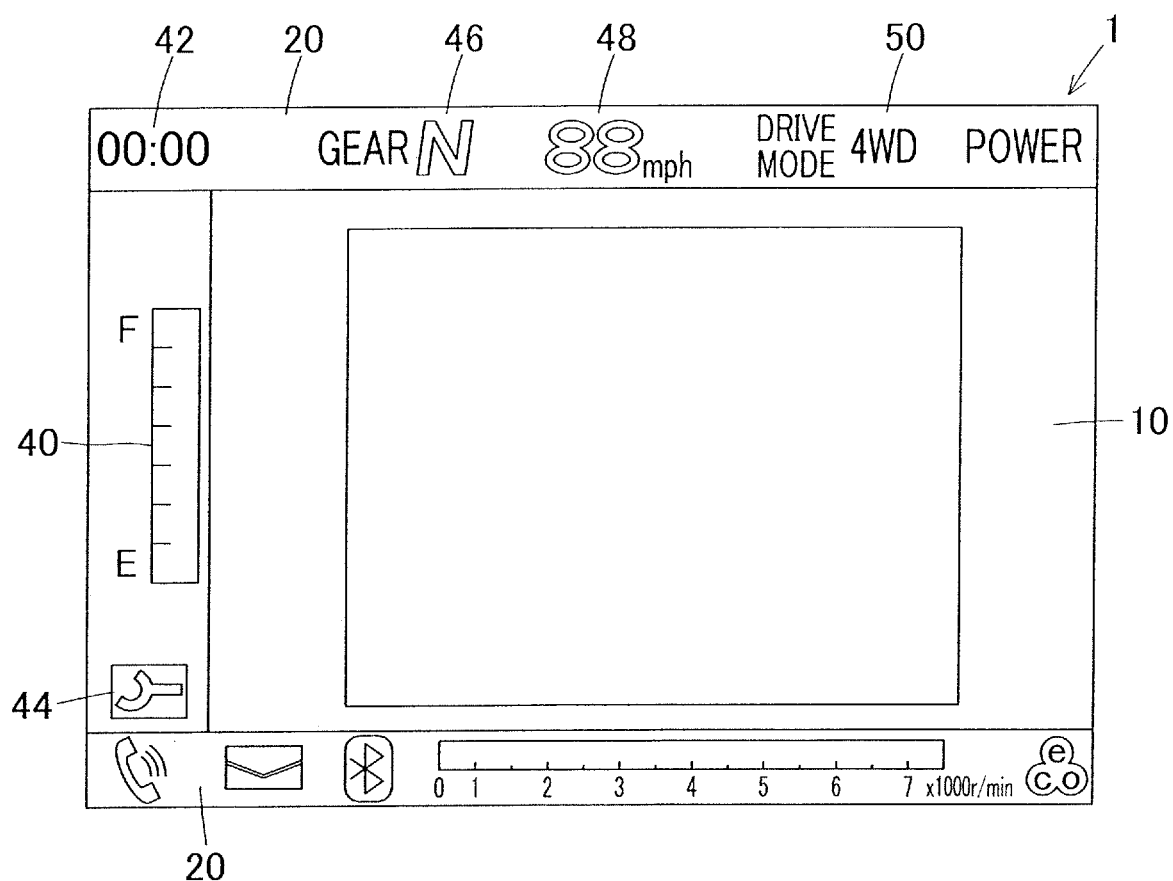
FIG. 4 shows a variant of a display of the instrument panel.

As shown in a variant illustrated in FIG. 4, the second region 20 may include the lower part of the display. This makes it possible to advantageously use the lower part of the display to display the travelling information 14.

Figure 5:
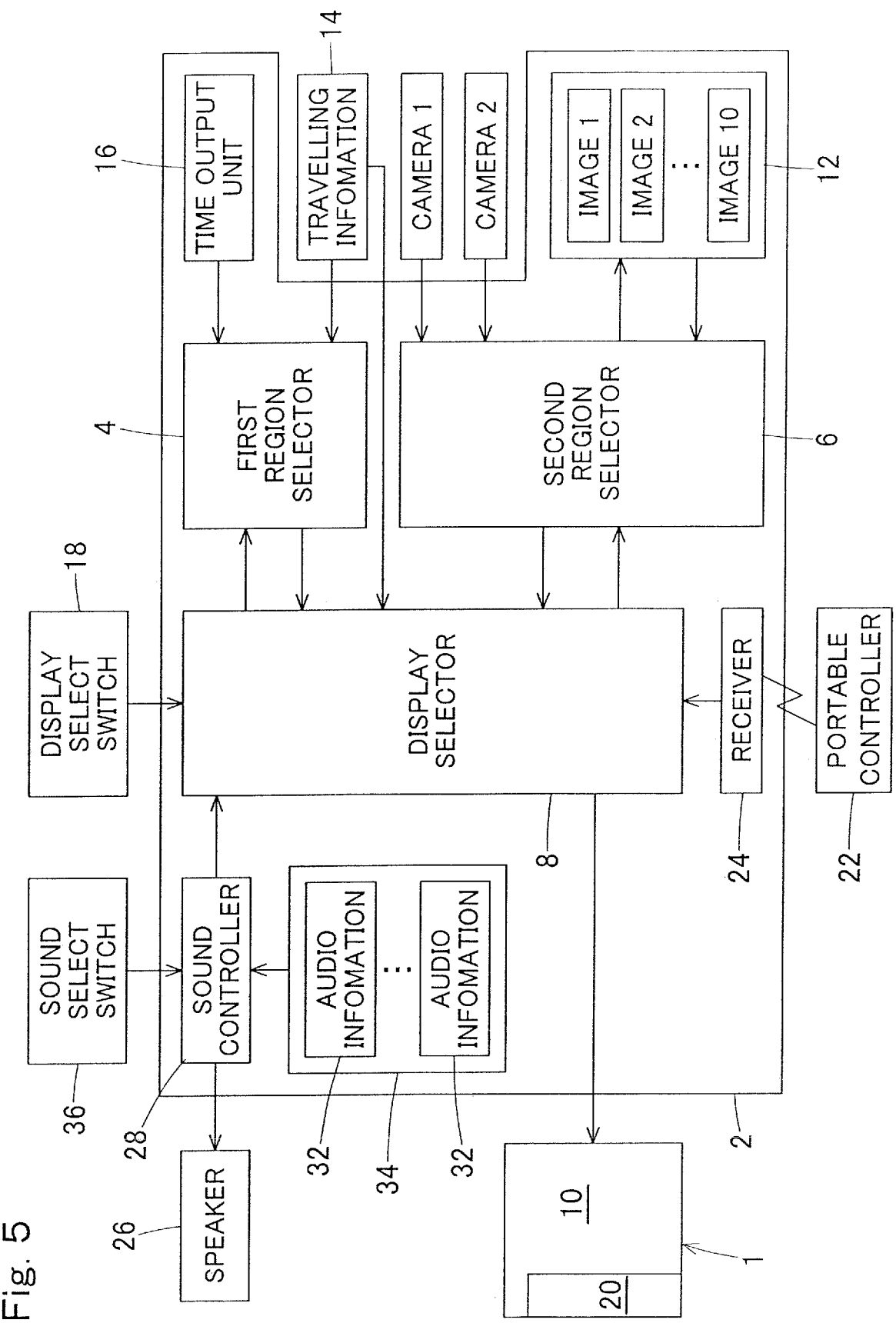
FIG. 5 is a system diagram of an instrument panel for a leisure vehicle according to a second embodiment of the present invention.
Figure 6:
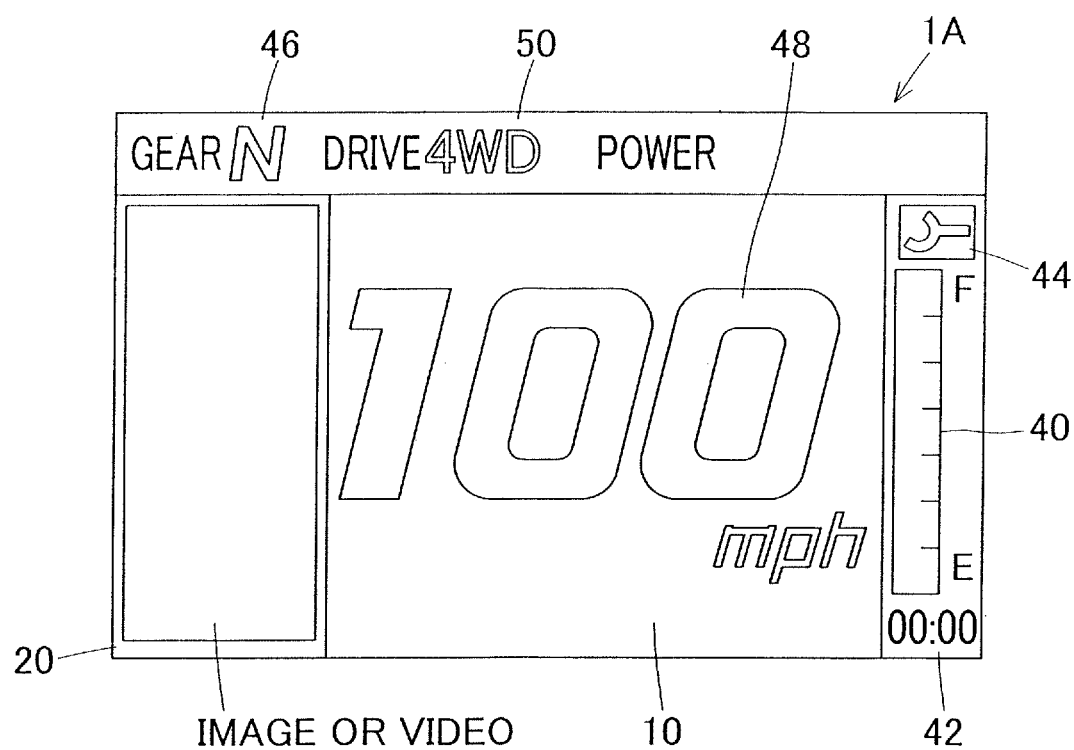
FIG. 6 shows a display of the instrument panel.

FIG. 5 is a system diagram of an instrument panel 1A of a leisure vehicle according to a second embodiment of the present invention. FIG. 6 shows an example of a display of the instrument panel 1A. In the second embodiment, the first region 10 displays the travelling information 14, and the second region 20 displays the predetermined images 1 to 10 or the videos from the cameras 1, 2. That is, as shown in FIG. 5, the travelling information 14 is output to the first region selector 4, and the images 1 to 10 or the videos from the cameras 1, 2 are output to the second region selector 6. As shown in FIG. 6, the second region 20 of the instrument panel 1A is defined in a major part of the display, excluding an upper portion of the left part. Other features of this embodiment are the same as those of the first embodiment.

The second embodiment also makes it possible to display a family photo or an image of preference or the like of a user or a video captured by the camera installed in the vehicle on the instrument panel 1A. This enhances enjoyment in leisure time as well as makes it possible to check surrounding circumstances through the video from the camera, improving operability of the vehicle. Since the travelling information 14 is displayed in the first region 10 located in the center of the image, which makes it easy to see the travelling information 14 and further improves operability of the vehicle.

The predetermined images 1 to 10 or the videos from the cameras 1, 2 are displayed in the left part of the display. Since the second region 20 is arranged in the left part of the display which is easy to see, enjoyment in leisure time and operability of the vehicle are further improved.

The predetermined images 1 to 10 may be displayed in the lower part of the display. Since the lower part of the display is hard to see, the predetermined images 1 to 10 may be displayed in this region, but the videos from the cameras 1, 2 may not be displayed in this region. Thus, the lower part of the display can be advantageously used to enhance enjoyment in leisure time.

The display according to each embodiment described above is a mere example. As long as the second region 20 is located at least a part of the peripheral part of the display, it is not limited to the configurations described for the above embodiments. Also, the travelling information 14 to be displayed is not limited to those described for the above embodiments. Further, the second display 30 shown in FIG. 3 may configured to display different travelling information 14 in accordance with a plurality of set speeds. For example, when driving at high speed exceeding a certain speed, a speedometer and a rotation speed meter may be displayed, whereas when driving at low speed, a fuel gauge may be displayed, instead of the rotation speed meter. It is also possible to change the images 1 to 10 to be displayed on the display for each operation key of the vehicle, i.e., for each user.

The present invention will not be limited to the above embodiments, and various additions, modifications, or deletions may be made without departing from the scope of the invention. For example, the receiver 24 and the sound controller 28 may be omitted. Accordingly, such variants are included within the scope of the present invention.

REFERENCE NUMERALS 1, 1A . . . Instrument panel
10 . . . First region
14 . . . Travelling information
20 . . . Second region
22 . . . Portable controller
26 . . . Speaker
28 . . . Sound controller
30 . . . Second display
32 . . . Audio information
42 . . . Current time
44 . . . Indicator that indicates a failure state (travelling information)

What is claimed is:

1. An instrument panel for a leisure vehicle, the instrument panel comprising a display, the display including:
   a first region including a central part of the display, the first region being configured to display a predetermined image set by a user or a video from a camera installed in the vehicle; and
   a second region including at least a part of a peripheral part of the display, the second region being configured to display travelling information indicating a travelling condition,
   wherein the first region is provided therein with a second display configured to display the travelling information, the travelling information in the second display being displayed when a travelling speed of the leisure vehicle is greater than a threshold speed.

2. The instrument panel for the leisure vehicle as claimed in claim 1, wherein the first region accounts for 50% or more of the whole display.

3. The instrument panel for the leisure vehicle as claimed in claim 1, wherein the second region includes at least one of an upper part, a left part, and a right part of the display.

4. The instrument panel for the leisure vehicle as claimed in claim 3, wherein the second region further includes a lower part of the display.

5. The instrument panel for the leisure vehicle as claimed in claim 1, wherein the travelling information includes an indicator that indicates a failure state of the leisure vehicle.

6. The instrument panel for the leisure vehicle as claimed in claim 1, wherein the second region is further configured to display current time, and the current time is displayed in a color that changes in accordance with a time frame in which the current time is included.

7. The instrument panel for the leisure vehicle as claimed in claim 1, further comprising a sound controller configured to, in response to a command from the user to a speaker installed in the leisure vehicle and configured to output audio information including music, control an operation of the speaker.

8. The instrument panel for the leisure vehicle as claimed in claim 1, wherein the first region displays a video of an area behind the leisure vehicle captured by the camera when the vehicle enters a backward travelling condition.

9. The instrument panel for the leisure vehicle as claimed in claim 1, wherein a portable controller is used to select the predetermined image in the first region.

10. The instrument panel for the leisure vehicle as claimed in claim 1, wherein one of the predetermined images is stored in an image storage unit, and is displayed when selected by the user.

11. A leisure vehicle comprising
wheels;
suspensions supporting the wheels to a vehicle body; and
an instrument panel comprising a display displaying a condition of the leisure vehicle, wherein the display includes:
  a first region including a central part of the display, the first region being configured to display a predetermined image set by a user or a video from a camera installed in the vehicle; and
  a second region including at least a part of a peripheral part of the display, the second region being configured to display travelling information indicating a travelling condition, and
the first region displays a video of an area ahead of the leisure vehicle and captured by the camera on the basis of a motion of the suspensions.

12. The leisure vehicle as claimed in claim 11, wherein the predetermined image or the video from the camera installed in the leisure vehicle is displayed in a left part or a right part of the display within the first region.

13. The leisure vehicle as claimed in claim 11, wherein the predetermined image is also displayed in a lower part of the display within the first region.

* * * * *